United States Patent
Celi, Jr. et al.

(10) Patent No.: US 8,321,346 B2
(45) Date of Patent: Nov. 27, 2012

(54) AUTOMATED TELLER MACHINE FOR USE WITH COMPUTING DEVICES

(75) Inventors: Joseph Celi, Jr., Boca Raton, FL (US); Thomas E. Creamer, Boca Raton, FL (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 2203 days.

(21) Appl. No.: 10/324,535

(22) Filed: Dec. 19, 2002

(65) Prior Publication Data

US 2004/0122771 A1    Jun. 24, 2004

(51) Int. Cl.
*G06Q 40/00* (2006.01)
(52) U.S. Cl. .......................... 705/43; 705/40
(58) Field of Classification Search .............. 705/43, 705/40
See application file for complete search history.

(56) References Cited

U.S. PATENT DOCUMENTS

| | | | | |
|---|---|---|---|---|
| 5,337,353 A * | 8/1994 | Boie et al. | ............... | 379/433.01 |
| 6,023,688 A * | 2/2000 | Ramachandran et al. | ...... | 705/44 |
| 6,027,024 A | 2/2000 | Knowles | ............ | 235/472.01 |
| 6,177,683 B1 | 1/2001 | Kolesar et al. | ............... | 250/566 |
| 6,193,161 B1 | 2/2001 | Sojka et al. | ............ | 235/472.01 |
| 6,230,970 B1 | 5/2001 | Walsh et al. | ............ | 235/379 |
| 6,345,764 B1 | 2/2002 | Knowles | ............ | 235/472.01 |
| 6,796,490 B1 * | 9/2004 | Drummond et al. | ......... | 235/379 |
| 7,025,256 B1 * | 4/2006 | Drummond et al. | ......... | 235/379 |
| 7,040,533 B1 * | 5/2006 | Ramachandran | ............ | 235/379 |
| 7,136,623 B2 * | 11/2006 | Fare et al. | ............ | 455/41.2 |
| 7,490,758 B2 * | 2/2009 | Drummond et al. | ......... | 235/379 |
| 2001/0034717 A1 | 10/2001 | Whitworth | ............ | 705/64 |
| 2001/0044324 A1 | 11/2001 | Carayiannis et al. | ......... | 455/564 |
| 2001/0051915 A1 | 12/2001 | Ueno et al. | ............ | 705/39 |
| 2001/0051922 A1 * | 12/2001 | Waller et al. | ............ | 705/43 |
| 2001/0056402 A1 * | 12/2001 | Ahuja et al. | ............ | 705/43 |
| 2002/0099658 A1 * | 7/2002 | Nielsen et al. | ............ | 705/43 |
| 2002/0138433 A1 * | 9/2002 | Black et al. | ............ | 705/43 |
| 2003/0058261 A1 * | 3/2003 | Challa et al. | ............ | 345/690 |

(Continued)

FOREIGN PATENT DOCUMENTS

GB    2293475    3/1996

(Continued)

OTHER PUBLICATIONS

P. Agrawal, et al., A Testbed for Mobile Networked Computing, Communications—Gateway to Globization: *1995 IEEE Int'l Conf on Communications*, Seattle, vol. 1, pp. 410-416, (1995).

(Continued)

*Primary Examiner* — Thomas Dixon
*Assistant Examiner* — Benjamin S Fields
(74) *Attorney, Agent, or Firm* — Novak Druce + Quigg LLP

(57) ABSTRACT

Using a portable device, a method of conducting commerce can include executing within the portable device an application configured to communicate with an automated teller machine by displaying graphic symbols. A user input specifying transaction information which can include at least a personal identification code for a transaction can be received. The method further can include generating a graphic symbol specifying the transaction information and displaying the graphic symbol upon a display screen of the portable device. Accordingly, a graphic symbol reader of an automated teller machine can read the graphic symbol and process the transaction.

3 Claims, 2 Drawing Sheets

U.S. PATENT DOCUMENTS

2005/0071230 A1 * 3/2005 Mankoff .................. 705/14

FOREIGN PATENT DOCUMENTS

| JP | 7195752 | 8/1995 |
|---|---|---|
| JP | 2001-325468 | 11/2001 |
| WO | WO83/00251 | 1/1983 |

OTHER PUBLICATIONS

L. Asböck, New Ideas With New Computers: The Epson Handy Terminals, *Mikro-und Kleincomputer*, vol. 9, No. 6, pp. 17-20, (Dec. 1987).

M. Anger, TRS 80 Model 100: A "New Look" Portable, *Micro Systemes*, Issue 37, pp. 86-91, (Dec. 1983).

B. D. Rauch, *Wearable Computers*, <http://eies.njitedu/~turoff/coursenotes/CIS732/samplepro/brian_732.htm>, (Dec. 16, 1999).

J. Rekimoto, et al., The World Through the Computer: Computer Augmented Interaction With Real World Environments, *UIST '95*, pp. 29-36, (Nov. 14-17, 1995).

R. Kumar, Internet Appliance Solutions: The Pocket Partner, *Accetent Systems. Inc.*, (2001).

K. Matsumoto, et al., Area Control System Via Bar Code ($2^{nd}$ Dimension) Displayed on Cellular or Other Mobile Terminal (Like Workpad), *IBM Technical Data Bulletin*, No. 454, Art. 126, pp. 294, (Feb. 2002).

* cited by examiner

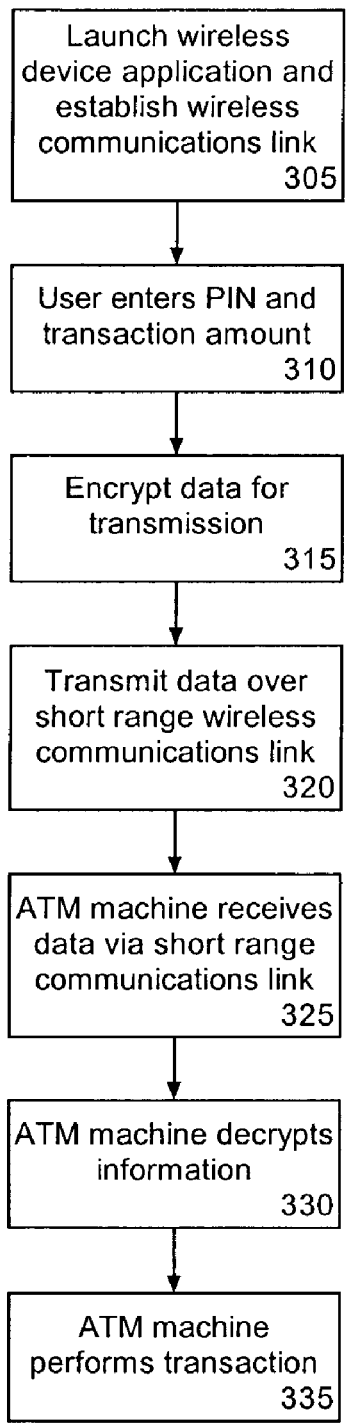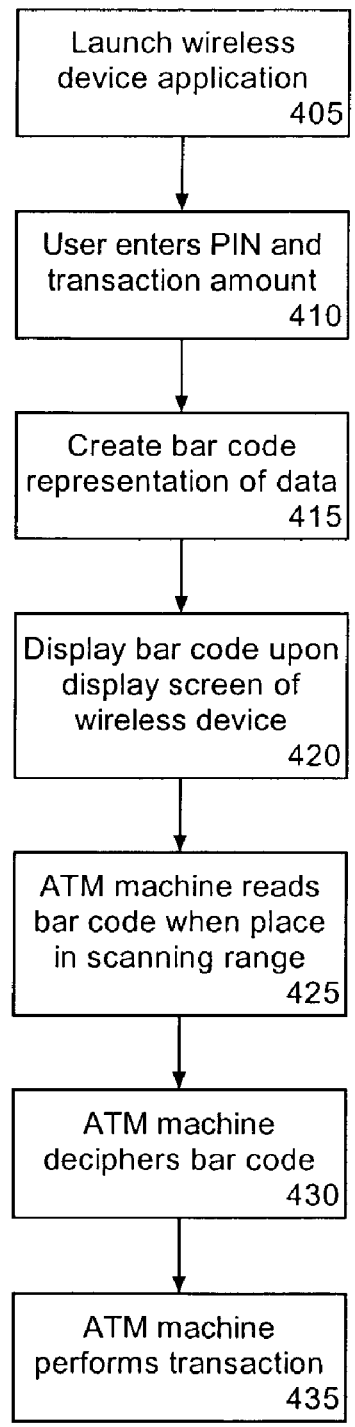
FIG. 3
FIG. 4

AUTOMATED TELLER MACHINE FOR USE WITH COMPUTING DEVICES

BACKGROUND OF THE INVENTION

1. Technical Field

The invention relates to the field of automated teller machines and, more particularly, to using automated teller machines with wireless computing devices.

2. Description of the Related Art

Automated teller machines, commonly referred to as ATM's, provide users with 24 hour, automated access to their financial accounts. Through ATM's, users can access bank account and/or credit lines to check available balances, withdraw money, make deposits, transfer money between accounts, or conduct any of variety of other possible financial transactions.

Presently, users access ATM's using a card which includes a magnetic strip having information encoded thereupon. Once inserted into or "swiped" past a card reader, the ATM can read the information encoded on the magnetic strip. The user can interact with and provide information to the ATM via a series of buttons available on the face of the ATM. The user can receive feedback from the ATM machine via a display screen and/or a speaker disposed within the ATM. Of course, the ATM also includes a monetary dispensing mechanism which can dispense money to a waiting user.

Although ATM's provide a level of convenience to users, which up until several years ago was unavailable, ATM's still have several disadvantages with regard to usability. One such disadvantage is that ATM's do not provide enhanced usability features for visually impaired users. Conventional ATM's imprint keys with Braille and provide Braille instructions. The configuration of ATM machines, however, can vary from manufacturer to manufacturer. In consequence, the positioning of the keys of an ATM as well the positioning of the instructions can vary making navigation of ATM controls difficult for visually impaired users.

Another disadvantage of ATM's is that in order to access the ATM, a user must approach the machine and physically manipulate the controls. ATM controls, for example the display, the buttons, the monetary dispenser, etc., may be positioned or arranged in such a fashion that disabled users have difficulty in accessing the controls. For example, a user confined to a wheelchair may have difficulty viewing the ATM display screen or reaching the ATM keypad or control buttons.

SUMMARY OF THE INVENTION

The present invention provides a solution for conducting financial transactions using a portable device and an automated teller machine (ATM). Using a portable device, a user can interact with an ATM to perform one or more financial transactions. The portable device can provide users, especially disabled users, with improved accessibility features as well as an interface which can remain constant from ATM to ATM. Through a suitably configured portable device, the user can provide instructions to an ATM via short range wireless communications, cellular or long range communications, and/or by presenting graphic symbols upon the display screen of the portable device. Accordingly, using the present invention, a user can access the functionality provided by a suitably configured ATM via the portable device.

One aspect of the present invention can include a method of conducting commerce using a portable device. The method can include executing an application within the portable device, wherein the application is configured to communicate with an ATM having a graphic symbol reader. The method can include receiving a user input specifying transaction information which includes at least a personal identification code and generating a graphic symbol specifying the transaction information. The graphic symbol can be displayed upon a display screen of the portable device. Accordingly, a graphic symbol reader of the ATM can read the graphic symbol and process the transaction.

If the user input further specifies supplemental information for the potential transaction such as an account and/or a transaction type, the graphic symbol that is generated can specify the supplemental information. In one embodiment, the method can include identifying supplemental information associated with the user to be used for the transaction, generating a second graphic symbol specifying the supplemental information, and displaying the second graphic symbol upon the display screen of the portable device.

Another aspect of the present invention can include executing an application within a wireless computing device, wherein the application is configured to communicate with an ATM via a wireless communications link. In that case, the method can include receiving a user input specifying transaction information which can include at least a personal identification code and sending a wireless transmission to an ATM via a short range wireless communications link. Still, depending upon the particular embodiment of the present invention, other forms of wireless communications also can be used such as cellular or wireless telephone calls for communicating with the ATM. The wireless transmission can specify the transaction information such that the ATM, equipped with a short range wireless transceiver or other cellular receiver as the case may be, can receive the wireless transmission and process the transaction. If the user input specifies supplemental information for the potential transaction, the method can include sending a wireless transmission which specifies the supplemental information.

Another aspect of the present invention can include, within an ATM, receiving a user input over a wireless communications link specifying transaction information for a transaction which can include at least a personal identification code associated with a user. According to this aspect of the present invention, the receiving step can include reading a graphic symbol presented upon a display screen of a portable device, wherein the graphic symbol can specify the transaction information. The graphic symbol can be deciphered to determine the transaction information for the transaction. Notably, the graphic symbol can specify supplemental information such as an account and/or a transaction type.

In another embodiment, the personal identification code can be used to identify an account to be used when processing the transaction. Alternatively, the identifying step can include prompting a user to identify supplemental information, reading a second graphic symbol presented upon the display screen of the portable device, wherein the second graphic symbol specifies the supplemental information, and deciphering the supplemental information from the second graphic symbol.

According to another aspect of the present invention, the step of receiving a user input can include establishing a short range wireless communications link with a wireless device, receiving a transmission via the short range wireless communications link, Wherein the transmission specifies the transaction information, and identifying the transaction information from the transmission. If the transmission is encrypted, the method can include decrypting the transmission.

The identifying step can include, over the wireless communications link, receiving a user input specifying the transaction information. The identifying step further can include requesting a user to identify supplemental information, for example by presenting a visual prompt upon a display screen of the ATM or by sending a wireless transmission via the wireless communications link to the wireless device. Accordingly, a user input specifying the supplemental information can be received over the wireless communications link and the transaction can be processed.

Another aspect of the present invention can include an ATM having a graphic symbol reader for scanning graphic symbols, a monetary dispensing mechanism, and a modem for communicating with an information processing system. The ATM also can include a processor configured to decipher transaction information from scanned graphic symbols, initiate communications via the modem, and command the monetary dispensing mechanism to dispense money according to the communications.

The ATM further can include a short range wireless transceiver configured to receive transaction information from a portable, wireless computing device over a short range wireless communications link as well as a cellular or long range wireless receiver or transceiver. The short range wireless transceiver can be included in place of or in addition to the graphic symbol reader. If a short range wireless transceiver is included, the processor can be configured to decipher transaction information from the wireless transmissions. A proximity detector can be included in the ATM. The proximity detector can be communicatively linked to the processor for initiating a scanning operation.

BRIEF DESCRIPTION OF THE DRAWINGS

There are shown in the drawings embodiments which are presently preferred, it being understood, however, that the invention is not limited to the precise arrangements and instrumentalities shown.

FIG. 3 is a flow chart illustrating a method of performing a financial transaction using the system of FIG. 1

FIG. 4 is a flow chart illustrating another method of performing a financial transaction using the system of FIG. 2.

DETAILED DESCRIPTION OF THE INVENTION

The present invention provides a solution for conducting financial transactions using a wireless computing device and an automated teller machine (ATM). More particularly, using a wireless device, a user can interact with an ATM to perform one or more financial transactions. Responsive to user instructions, a properly configured wireless computing device can communicate with an ATM. The wireless computing device can communicate with the ATM via short range wireless communications and/or by presenting bar codes upon the display screen of the wireless computing device.

The term "bar code" as used herein, can include any of a variety of graphic symbols or visual images. The bar code can be formed from an ordering of spaced vertical bars, wherein both the thickness of the bars and the amount of space between the bars can vary. The arrangement of bars and spacing specifies encoded information. For example, the bar code can be a conventional low, medium, or high density bar code. The bar code, however, also can be a single dimension, dual dimension and/or multidimensional bar code. Still, the bar code need not be formed of bars and spaces at all, but rather any image which can be read or interpreted using a scanning device capable of detecting visually detectable patterns, referred to as a "bar code" reader or scanner. Although a variety of existing bar code encoding standards exist, a bar code can specify information, whether numbers, characters, and/or symbols, using any protocol which both the bar code reader, and decoder if separate from the bar code reader, and the bar code generating device have been configured or programmed to implement.

Figure 1:
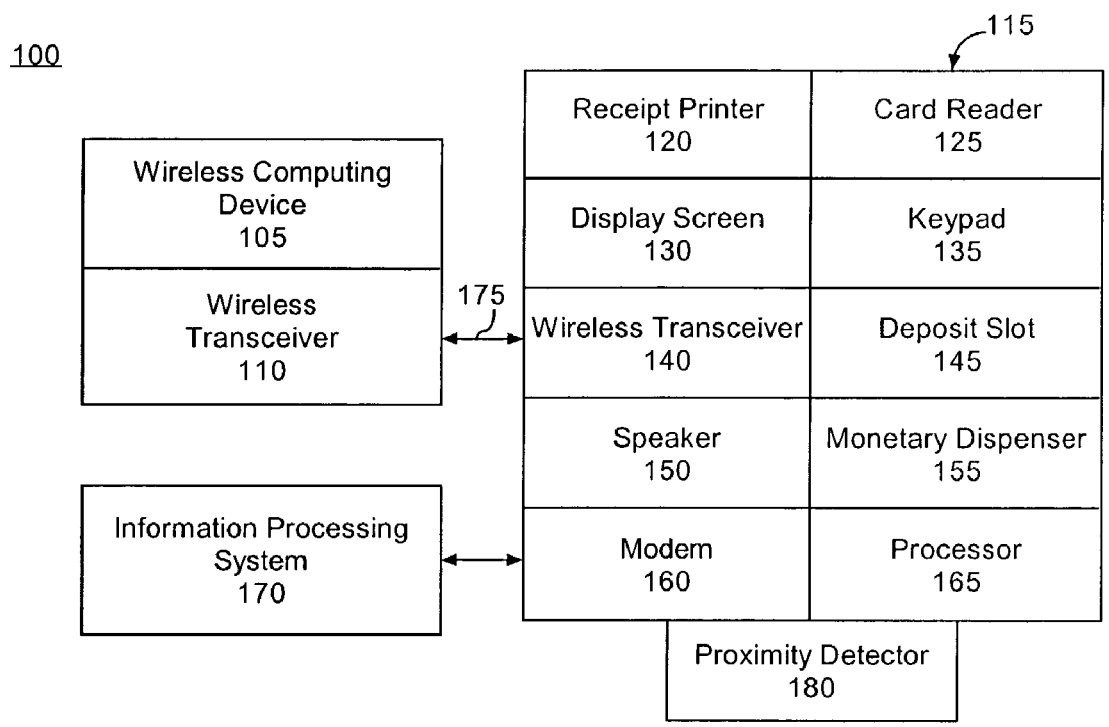
FIG. 1 is a schematic diagram illustrating a system for performing financial transactions in accordance with the present invention.

FIG. 1 is a schematic diagram illustrating a system 100 for performing financial transactions in accordance with the present invention. As shown, the system 100 can include a wireless device 105, an ATM 115, and an information processing system 170. The wireless device 105 can be a portable, wireless computing device (wireless device) such as a personal digital assistant, a laptop computer, a wireless or cellular telephone, or the like. The wireless device 105 can be configured to conduct long range wireless communications such as establishing wireless or cellular telephone calls or accessing the Internet, the Web, or another computing network via a wireless data communications link.

The wireless device 105 can be configured to execute one or more applications configured to conduct short range wireless communications with a suitably configured ATM, such as ATM 115 to be described in greater detail herein. Accordingly, the wireless device 105 can provide an execution environment for executing any of a variety of different applications, whether browser-based applications or self-contained applications which do not require a virtual machine for execution. For example, according to one embodiment of the present invention, the wireless device can include an execution environment which supports the execution of client applications created in conformance with the Java™ 2 Enterprise Edition (J2EE) platform.

The wireless device 105 can include a wireless transceiver 110 for conducting short range wireless communications. Notably, according to one aspect of the present invention, the wireless device 105 can be configured solely to communicate via a short range, wireless communications link. For example, the wireless device 105 can include a Bluetooth enabled wireless transceiver or a wireless transceiver configured to communicate via one of the 802.11 family of wireless communications protocols.

The ATM 115 can include several components commonly found in an ATM such as a receipt printer 120, a card reader 125, a display screen 130, a keypad 135, and a deposit slot 145. Additionally, the ATM 115 can include a speaker 150, a monetary dispenser 155, a modem 160, a processor 165, and a proximity detector 180. The ATM 115 can include one or more data stores or memories (not shown) as may be required. Accordingly, the ATM 115 can include an application which can be executed by the processor 165 thereby allowing each of the aforementioned components to operate under the control and coordination of the processor 165.

The ATM 115 can perform functions commonly attributed to an ATM. For example, the processor 165 can execute an application allowing the ATM 115 to receive a magnetically striped card via the card reader 125, read the card, query a user for additional identifying information via the display screen 130 and/or the speaker 150, and receive information from the user via the keypad 135. Deposits can be received via the deposit slot 145 and money can be dispersed to a user via the monetary dispenser 155. The user can receive a hardcopy receipt evidencing the transaction via the receipt printer 120.

Notably, the ATM 115 can include a wireless transceiver 140 for conducting short range wireless communications which can be configured to communicate with the wireless transceiver 110 of the wireless device 105. For example, the wireless transceiver 140 can be a Bluetooth enabled wireless transceiver or a wireless transceiver configured to communicate via one of the 802.11 family of wireless communications protocols. The wireless transceiver 140 can be communicatively linked to the processor 165 and signal or interrupt the processor 165 when a wireless device has been detected or a signal has been received from a wireless device.

According to one embodiment, the ATM can begin monitoring for the presence of a wireless device when a signal is received from the proximity detector 180. The proximity detector 180 can be implemented using any of a variety of different technologies. For example, the proximity detector 180 can be implemented as a motion detector, whether using infrared light, or a more complex image processing system which incorporates a camera and digital imaging.

The ATM 115 also can include a modem which can operate under the control of the processor 165. Through the modem, the ATM 115 can establish a communications link with the information processing system 170. The information processing system 170 can provide transaction approval and verification functions. For example, the information processing system 170 can include a host computer through which the ATM 115 can access a banking computer or other computer system associated with a financial institution.

In operation, when activated, the wireless device 105 can establish a wireless communications link 175 with the ATM 115. More particularly, the wireless transceiver 110 of the wireless device 105 and the wireless transceiver 140 of the ATM 115 can establish the wireless communications link 175. For example, communications can be established responsive to a user request. Alternatively, if both the wireless device 105 and the ATM 115 are active, the wireless communications link 175 can be automatically established, for example in the case where the ATM 115 detects a wireless signal or transmission. Data stored in the wireless device 105 and/or data entered by a user can be transmitted to the ATM 115 through the wireless communications link 175, for example under the direction of the application executing within the wireless device 105. Notably, the ATM 115 can provide response or prompt information back to the wireless device 105 also through the wireless communications link 175.

Figure 2:
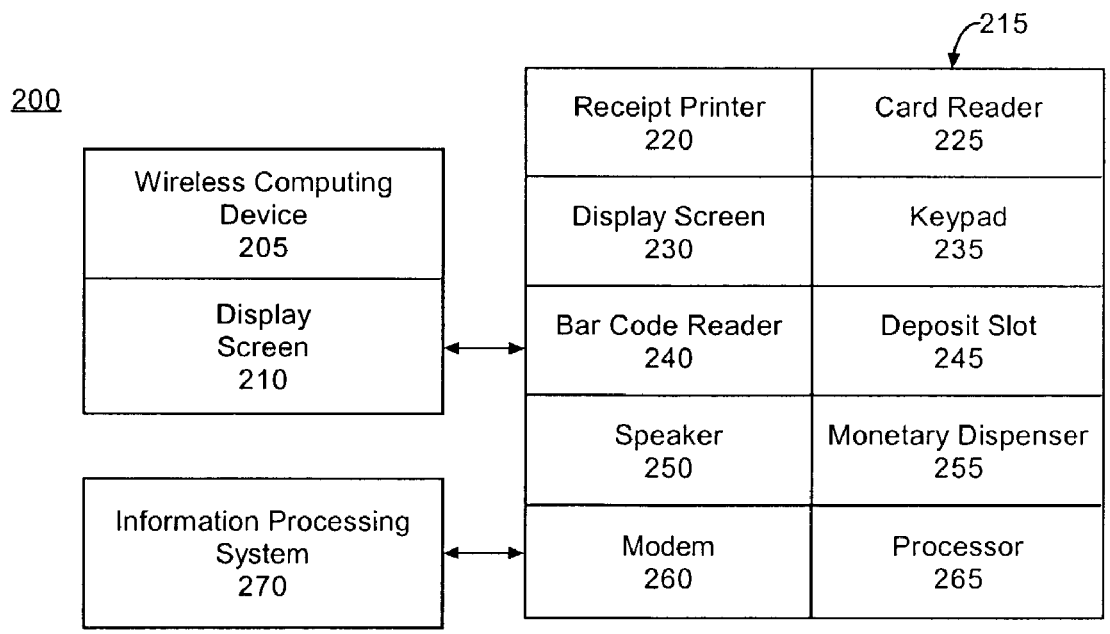
FIG. 2 is a schematic diagram illustrating a system for performing financial transactions in accordance with another aspect of the present invention.

FIG. 2 is a schematic diagram illustrating a system 200 for performing financial transactions in accordance with the present invention. The system 200 can include a wireless computing device 205, an ATM 215, as well as an information processing system 270. The components can be implemented and function in similar fashion to those previously described with reference to FIG. 1, with the exception of several features to be described herein.

The wireless device 205, similar to the wireless device of FIG. 1, can be any of a variety of different portable wireless computing devices as described. The wireless device 205, however, can include a display screen 210. This is not to suggest that the wireless device of FIG. 1 must not or does not include a display screen, but only that the embodiment of FIG. 2 does include such a display screen 210. The display screen 210 can be a liquid crystal display (LCD) screen, or any other display screen which can be used to present a bar code such that the bar code can be read by a bar code reader. In this embodiment, the wireless device 205 can include an application program which is configured to dynamically generate bar codes and present the bar codes upon the display screen 210 of the wireless device 205.

The ATM 215, as shown and similar to the ATM of FIG. 1, can include a receipt printer 220, a card reader 225, a display screen 230, a keypad 235, and a deposit slot 245. The ATM 215 further can include a speaker 250, a monetary dispenser 255, a modem 260, and a processor 265. In this embodiment, the ATM 215 can include a bar code reader 240. The bar code reader 240 can be implemented using any of a variety of different bar code scanning technologies. For example, the bar code reader 240 can be implemented as a laser bar code reader or as a charge-coupled device (CCD) array bar code reader.

The bar code reader 240 can be configured to continually scan within a predetermined target range proximate to the ATM 215. Alternatively, the bar code reader 240 can be configured to scan a predetermined range responsive to an event such as a user request. Notably, the ATM 215 also can include a proximity detector (not shown), in which case the bar code reader 240 can begin scanning responsive to a detection of motion or the presence of an object located proximate to the ATM 215.

In operation, the ATM 215 can communicate with the wireless device 205 by reading bar codes presented upon the display screen 210 of the wireless device 205. More particularly, the application executing within the wireless device can generate a bar code and cause the bar code to be presented upon the display screen 210 of the wireless device 205. Accordingly, the bar code reader 240, under the direction of an application executing within the ATM 215, can scan or read the displayed bar code and decipher information necessary to perform a transaction. Further user information can be received from the user via the keypad 235 or by scanning different bar codes which subsequently can be displayed upon the display screen 210 of the wireless device 205 under the direction of the application program executing therein.

FIG. 3 is a flow chart illustrating a method 300 of performing a financial transaction using the system of FIG. 1, wherein both the wireless device and the ATM are equipped with suitable, short range wireless transceivers. The method 300 can begin in step 305, where an application within the wireless device can be launched. The application can be launched automatically when the wireless device is powered on, or can be launched responsive to an event such as a wireless device system event or a user request. Once executing, the application can communicate with the wireless transceiver within the wireless device. Accordingly, upon a user request, the wireless device can establish a wireless communications link with a wireless ATM. Still, as noted, the wireless device automatically can detect a wireless access node such as a wireless ATM when the wireless device is located proximate to the ATM.

In step 310, a user can provide an input to the wireless device specifying a personal identification number (PIN) and a transaction amount. For example, a user can select an option via the wireless device application which prompts the user to supply the PIN and transaction amount. Depending upon whether the device is speech enabled, the user can speak the information, enter the information using buttons of the wireless device, whether by activating graphically generated buttons upon a touch screen or physical buttons.

Notably, according to one embodiment of the invention, the transaction can be assumed to be a withdrawal. Still, the user can specify additional supplemental information, including but not limited to, a transaction type such as transfer of funds, a bill payment, a deposit, a balance check, or any other financial transaction which can be performed using an ATM as well as an account to be accessed for the transaction. If an account is not specified, a default account can be assumed.

In step 315, the application within the wireless device can encrypt the user specified transaction data using a predetermined encryption methodology which the ATM has been configured to decode. For example, the financial institution providing the ATM, or in which the user's accounts are located, can provide the application to the user for use on the wireless device.

In step 320, the wireless device can transmit the encrypted data via the short range, wireless communications link. The ATM can receive the encrypted data over the short range wireless communications link in step 325. In step 330, the ATM can decode or decrypt the received information under the direction of the application executing therein. As noted, the application can utilize the same encoding/decoding and/or encryption/decryption scheme as the wireless device. Thus, the ATM has received the user's PIN and an amount of a transaction. If no transaction type is specified, the ATM can assume the user wishes to make a withdrawal. A default account can be assumed, such as a checking account, or one can be specified by the user, for example within the encrypted information received by the ATM from the wireless computing device.

In step 335, the ATM machine can perform the transaction. That is, the ATM, if necessary, can contact the information processing system to determine whether sufficient funds exist to process a withdrawal request or to determine a balance pursuant to a user inquiry. The ATM can complete the transaction, for example by providing the user with requested funds for a withdrawal. Notably, the ATM can provide response information such as an indication that the transaction is in process, has completed, that the transaction has been approved or declined, as well as provide supplemental marketing information such as promotional materials whether related to the user's financial institution or not. This response information can be transmitted to the user via the short range wireless communications link for display upon a display screen of the wireless device or for playback via an audio system which can be included in the wireless device.

FIG. 4 is a flow chart illustrating another method 400 of performing a financial transaction using the system of FIG. 2. In accordance with this embodiment of the present invention, although the device can be wirelessly-enabled, the device need not be a wireless device. That is, the device can be configured to generate and display bar codes. Accordingly, the device, under the direction of the application program previously noted, can be programmed to generate bar codes and the ATM can be equipped with a bar code reading device. The method 400 can begin in step 405 where the wireless device application can be launched as described. In step 410, a user input can be received by the wireless device. The user input can specify information such as the user's PIN, an account, a transaction amount, as well as a particular transaction type if necessary.

Notably, according to one embodiment, the PIN code itself can be linked to a particular user account. In that case, the user need not specify a particular account directly, but rather enter a PIN code which corresponds with the account to be accessed when performing the user specified transaction. Similarly, the user can append one or more digits to a PIN code thereby indicating a particular transaction. For example, a 1 following a PIN code can indicate a withdrawal while a 0 can indicate a deposit. The examples disclosed herein are provided for purposes of illustration only, and as such, are not intended as a limitation of the present invention.

In step 415, a bar code can be generated which represents the user specified transaction information, which can include, but is not limited to a PIN, an account, a transaction type, an amount if necessary for the transaction, as well as source and destination accounts, and the like. For example, the wireless device application can generate a bar code using a bar code generation or encoding methodology which is also utilized by the user's financial institution, and thus the ATM. That is, the ATM can be programmed to read the bar code and decipher user specified information from the bar code. In any case, in step 420, once the bar code has been generated, the bar code can be presented upon the display screen of the wireless computing device.

In step 425, the ATM can read the bar code. The user of the wireless device can place the device so that the bar code reader of the ATM can read the bar code. As mentioned, the ATM can be configured to constantly scan so that any bar code placed within the scanning zone of the ATM can be read. Alternatively, the ATM can begin scanning responsive to an event such as a user input provided via the keypad or a signal generated by another activating mechanism such as a proximity detector communicatively linked to the ATM processor. In step 430, having read the bar code from the display screen of the wireless device, the ATM can decipher the user specified information from the bar code. In step 435, the ATM can proceed with processing the user transaction.

Notably, if the ATM requires supplemental information, for example a transaction type and/or an account, the user can provide such information via the input mechanisms of the wireless device. Accordingly, the user entered supplemental information can be represented as a subsequent bar code and presented upon the display screen of the wireless device so that the ATM can read the bar code. The process can repeat as needed, with the ATM providing prompting via the ATM display screen and/or the ATM speaker.

Still, it should be appreciated that the methods disclosed herein are provided for purposes of illustration only. Accordingly, the various steps disclosed herein can be reordered according to the particular embodiment or implementation of the present invention. For example, a user can specify the various parameters of a transaction described as inputs and requests as a single large input or as a series of inputs wherein the user is prompted for each portion of information by either the application executing within the wireless device or by the ATM. The information, including the supplemental information can be provided as part of a first bar code or as part of a series of bar codes to be displayed sequentially. Similarly, the information and any supplemental information can be provided within a first short range wireless transmission or within a series of such transmissions.

As noted, depending upon the particular embodiment of the present invention, ATM prompting can be performed by using the ATM display screen or the ATM speaker. Alternatively, ATM prompting can be performed by sending a wireless transmission to the wireless device via the short range wireless communications link such that the wireless device can interpret the transmission and either display instructions to the user upon the display screen of the wireless device or play audio instructions to the user via a speaker or other audio interface of the wireless device.

According to one embodiment of the present invention, the application executing within the wireless device can be an electronic wallet application. The electronic wallet application can provide users with the ability to communicate with financial institutions through the wireless computing device to fund the electronic wallet application. Once funded, the electronic wallet application can be accessed by a user of the wireless device at a point of sale to pay for goods and/or services. Thus, the electronic wallet application can communicate with an ATM as disclosed herein to acquire funding.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for performing a financial transaction using a portable device and an automated teller machine comprising:
   the portable device configured for:
      executing an application configured to communicate with the automated teller machine;
      receiving a first user input specifying transaction information comprising at least a personal identification code for a transaction and a second user input specifying supplemental information, wherein the first user input and the second input are audible inputs that the portable device converts into a non-audible first user input specifying the transaction information and a non-audible second user input specifying supplemental information;
      generating a first graphic symbol specifying the transaction information and a second graphic symbol specifying the supplemental information; and
      displaying the first graphic symbol and the second graphic symbol upon a display screen of the portable device; and
   the automated teller machine including:
      a graphic symbol reader for continuously scanning any graphic symbol placed within a scanning zone of the automated teller machine and reading graphic symbols;
      a modem for communicating with an information processing system;
      a display screen or a speaker for prompting the user to provide supplemental information; and
      a processor configured to decipher transaction information and supplemental information from scanned graphic symbols, initiate communications via said modem, and process the transaction according to said communications; and
   wherein the automated teller machine is configured to send, during the transaction processing, to the portable device a transmission comprising promotional information from the automated teller machine via the display screen or the speaker of the automated teller machine, wherein the promotional information is targeted for the user.

2. The system of claim 1, wherein the portable device is a wireless device and the system further comprises a short range wireless transceiver configured for receiving transaction information from the wireless device.

3. The system of claim 1, further comprising:
   a proximity detector communicatively linked to said processor for initiating a scanning operation.

* * * * *